Patented Sept. 24, 1935

2,015,226

UNITED STATES PATENT OFFICE 2,015,226

COMPLEX METAL COMPOUND OF ORTHO HYDROXYAZO DYESTUFFS

Fritz Lange, Ludwigshafen-on-the-Rhine, Germany, assignor to General Aniline Works, Inc., New York, N. Y., a corporation of Delaware No Drawing. Application March 8, 1934, Serial No. 714,738. In Germany March 11, 1933

8 Claims. (Cl. 260—12)

The present invention relates to a process of producing valuable complex metal compounds of ortho-hydroxyazo dyestuffs.

The subject-matter of Patent No. 1,765,680 is a process for the manufacture and production of complex metal compounds of ortho-hydroxyazo dyestuffs by treating azo dyestuffs containing alkoxy groups in ortho-position to azo groups, with metal compounds suitable for the formation of complex metal compounds of dyestuffs under conditions under which a splitting off of alkyl radicles takes place.

I have now found that complex chromium compounds of ortho-hydroxyazo dyestuffs are obtained with advantage by treating azo dyestuffs containing alkoxy groups in ortho-position to azo groups with trivalent chromium salts of aromatic sulphonic acids under conditions under which a splitting off of the alkyl radicles from the azo dyestuffs takes place. Splitting off the alkyl groups is advantageously effected by heating the dyestuffs with chromium sulphonates of the kind defined in the presence of water at temperatures above 100° C., preferably between 110° and 150° C.; the most suitable range of temperature is between 130° and 150° C. Accordingly the reaction is preferably carried out under elevated pressure. The azo dyestuffs containing chromium thus obtained yield very pure and uniform dyeings of excellent fastness to light.

Neutral, acid or basic chromium salts of mono- and poly-sulphonic acids of aromatic hydrocarbons, as for example of benzene or naphthalene or their homologues or substitution products, for example such as contain halogen or nitro groups, are suitable for carrying out the process according to this invention; chromium salts of aromatic sulphonic acids containing hydroxy groups are usually not employed. The chromium salts of the aromatic sulphonic acids may also be employed in admixture with sulphates, formates or acetates of chromium or other chroming agents. The chroming may be carried out for example with chromium salts which are obtained by introducing chromium hydroxide or chromium oxide into sulphonation mixtures of benzene, naphthalene or other aromatic hydrocarbons without isolating the aromatic sulphonic acids concerned.

The sulphonic acids may be obtained in any suitable manner, for example by sulphonation by means of sulphuric acid, fuming sulphuric acid, sulphur trioxide, chlorsulphonic acid and the like.

Contrasted with the process described in the said patent No. 1,765,680, the process according to this invention offers the advantage that no volatile acids are formed which necessitate the employment of special apparatus because of the attack on the apparatus and which may be injurious to health.

The following examples will further illustrate the nature of this invention but the invention is not restricted to these examples. The parts are by weight.

Example 1

52 parts of the azo dyestuff derived from diazotized 1-methoxy-2-amino-4-chlorbenzene and 1-hydroxynaphthalene-3,8-disulphonic acid are made into a paste with 800 parts of water and heated with a solution containing 12 parts of 100 per cent chromium oxide, 68 parts of 100 per cent 1,5-naphthalenedisulphonic acid and 100 parts of water in a stirring autoclave for 1 hour at 120°, 1 hour at 130° and 2 hours at 135° C. The chromium compound formed is salted out in the usual manner with common salt. It yields pure very level dyeings of a blue shade on animal fibres.

Instead of the said dyestuff the dyestuff from diazotized 1-methoxy-2-amino-4-methyl-5-nitrobenzene and 1-hydroxynaphthalene-4,8-disulphonic acid or the dyestuff from diazotized 1-methoxy-2-amino-4-methyl-5-nitrobenzene with 2-hydroyynaphthalene-6,8-disulphonic acid may be treated in an analogous manner. Hereby complex chromium compounds are formed which dye wool and silk deep navy blue and blue violet shades, respectively.

Example 2

52 parts of the azo dyestuff derived from diazotized 1-methoxy-2-amino-4-chlorbenzene and 2-hydroxynaphthalene-6,8-disulphonic acid are made into a paste with 300 parts of water and heated for about 3 hours in a stirring autoclave at 130° C. with a solution containing 12 parts of 100 per cent chromium oxide, 45 parts of 100 per cent 1,5-naphthalenedisulphonic acid and 100 parts of water. The chromium compound formed is precipitated by the addition of hydrochloric or sulphuric acid. It yields pure violet dyeings on wool.

Instead of the chromium salt of 1,5-naphthalenedisulphonic acid, the chromium salt of beta-naphthalenesulphonic acid (formed by dissolving 12 parts of 100 per cent chromium oxide in the sulphonation mixture, diluted with water, obtained by the sulphonation of 54 parts of naphthalene with 54 parts of sulphuric acid of 66° Bé.

strength at about 160° C.) may be employed. By employing this chromium salt, the same dyestuff is obtained after treatment for about 4 hours at about 135° C. The chromium salts of alkylated (as for example butylated) benzene sulphonic acids or alpha- or beta-naphthalene sulphonic acids may also be employed.

*Example 3*

62 parts of the azo dyestuff derived from diazotized 1-methoxy-2-aminobenzene-4-sulphonic acid diethylamide and 2-hydroxynaphthalene-6,8-disulphonic acid are made into a paste with 300 parts of water and treated in a stirring autoclave for 4 hours at from 130° to 135° C. with a solution containing 11 parts of 100 per cent chromium oxide, 40 parts of 100 per cent 1,5-naphthalenedisulphonic acid and 100 parts of water. The chromium compound formed separates partly by itself, the portion remaining dissolved is precipitated by the addition of hydrochloric or sulphuric acid. The chromium compound yields pure very level Bordeaux red dyeings on wool or silk.

What I claim is:—

1. The process of producing complex chromium compounds of ortho-hydroxyazo dyestuffs, which comprises treating an azo dyestuff containing an alkoxy group in ortho-position to the azo group, with a trivalent chromium salt of an aromatic sulphonic acid under conditions under which a splitting off of the alkyl radicle from the azo dyestuff takes place.

2. The process of producing complex chromium compounds of ortho-hydroxyazo dyestuffs, which comprises treating an azo dyestuff containing an alkoxy group in ortho-position to the azo group, with a trivalent chromium salt of an aromatic sulphonic acid in the presence of water at temperatures above 100° C.

3. The process of producing complex chromium compounds of ortho-hydroxyazo dyestuffs, which comprises treating an azo dyestuff containing an alkoxy group in ortho-position to the azo group, with a trivalent chromium salt of an aromatic sulphonic acid in the presence of water at between 100° and 150° C.

4. The process of producing complex chromium compounds of ortho-hydroxyazo dyestuffs, which comprises treating an azo dyestuff containing an alkoxy group in ortho-position to the azo group, with a trivalent chromium salt of an aromatic sulphonic acid in the presence of water at between 130° and 140° C.

5. The process of producing complex chromium compounds of ortho-hydroxyazo dyestuffs, which comprises treating an azo dyestuff derived from diazotized 1-methoxy-2-amino-4-chlorbenzene and a hydroxynaphthalene-disulphonic acid with a trivalent chromium salt of an aromatic sulphonic acid in the presence of water at a temperature between 100° and 150° C.

6. The process of producing the complex chromium compound of an ortho-hydroxyazo dyestuff, which comprises treating the azo dyestuff derived from diazotized 1-methoxy-2-amino-4-chlorbenzene and 1-hydroxy-3,8-disulphonic acid with the trivalent chromium salt of 1,5-naphthalenedisulphonic acid in the presence of water at a temperature between 100° and 150° C.

7. The process of producing the complex chromium compound of an ortho-hydroxyazo dyestuff, which comprises treating the azo dyestuff derived from diazotized 1-methoxy-2-amino-4-chlorbenzene and 2-hydroxynaphthalene-6,8-disulphonic acid with the trivalent chromium salt of 1,5-naphthalenedisulphonic acid in the presence of water at a temperature between 100° and 150° C.

8. The process of producing the complex chromium compound of an ortho-hydroxyazo dyestuff, which comprises treating the azo dyestuff derived from diazotized 1-methoxy-2-aminobenzene-4-sulphonic acid diethylamide and 2-hydroxynaphthalene-6,8-disulphonic acid with the trivalent chromium salt of 1,5-naphthalenedisulphonic acid in the presence of water at a temperature between 100° and 150° C.

FRITZ LANGE.